United States Patent Office 3,013,083
Patented Dec. 12, 1961

3,013,083
PREPARATION OF REACTION PRODUCTS OF PENTABORANE-11 AND CONJUGATED DIENE HYDROCARBONS
Emil A. Lawton, Columbus, Ohio, and Earl A. Weilmuenster, Kenmore, N.Y., assignors, by direct and mesne assignments, to The Battelle Development Corporation, a corporation of Delaware
No Drawing. Filed Jan. 6, 1956, Ser. No. 557,635
3 Claims. (Cl. 260—606.5)

This invention relates to the manufacture of new chemical compositions which are reaction products of pentaborane-11 and certain diene hydrocarbons. The compositions can be used as fuel when burned with air, for example in a gas turbine.

It is known in the art to prepare pentaborane-11, which is a colorless, unstable liquid melting at −123° C. Pentaborane-11 is a boron hydride or borane, and the art is aware that the burning of a borane with oxygen liberates considerably more energy than the oxidation of a corresponding amount of hydrocarbon, producing very high flame temperatures. This suggests the use of pentaborane-11 as a fuel of very high energy content. Pentaborane-11 suffers from the disadvantage, among other things, however, that it has a relatively high vapor pressure, its vapor pressure being 52.8 mm. of mercury at 0° C. and its boiling point at atmospheric pressure being 65° C.

In accordance with the present invention, it has been discovered that pentaborane-11 and conjugated diene hydrocarbons containing from 4 to 6 carbon atoms can be reacted to form liquid products. These products are borohydrocarbons of relatively high boron content and at the same time they are reactants having a somewhat lower vapor pressure than pentaborane-11 itself, so that they constitute a conveniently handled fuel of considerably greater energy content than the simple hydrocarbon fuels.

In carrying out the process of this invention, the pentaborane-11 used can be a pure material, if desired. On the other hand, a pentaborane-11 in a somewhat impure form, for example, in admixture with up to about 35 mole percent of pentaborane-9, based upon the moles of pentaborane-11 introduced into the reaction system, can be utilized. The preparation of mixtures of pentaborane-9 and pentaborane-11 is disclosed in the art. For example, the article by A. B. Burg and H. I. Schlesinger, Journal of the American Chemical Society, volume 55, page 4009 (1933), describes the pyrolysis of diborane at a temperature of about 100–130° C. to produce a reaction product from which materials other than pentaboranes can be easily separated, leaving a mixture consisting essentially of about 80 mole percent of pentaborane-11 and 20 mole percent of pentaborane-9.

Among the conjugated diene hydrocarbons which can be employed in the process of this invention are 1,3-butadiene and 1,3-cyclopentadiene, as well as 1,3-pentadiene, isoprene, 2,4-hexadiene, 2-methyl-1,3-pentadiene and 4-methyl-1,3-pentadiene. Mixtures of the diene hydrocarbons also can be used. In general, the molar ratio of pentaboranes, including both pentaborane-11 and pentaborane-9, to diene hydrocarbon introduced into the reaction system will be within the range from 1 to 6, although somewhat lower and somewhat higher molar ratios can also be utilized. Usually, a reaction temperature within the range from about −40° C. to about 25° C. is employed.

The process of this invention will now be described with reference to specific examples. In all of these examples the pentaborane "reagent" was a mixture consisting essentially of about 80 percent by volume of $B_5H_{11}$ and 20 percent $B_5H_9$. The same type of apparatus was used in all of the examples. This apparatus had a reaction vessel connected to a manifold having a plurality of sections. Gas-tight connections between the reaction vessel and manifold, and between manifold sections, could be opened or closed as desired. For fractionation of the reaction products the reaction vessel was connected to a high vacuum line having a plurality of condensate traps.

*Example I*

A reaction vessel having a volume of 187 cc. was cooled to −196° C. and 69.5 cc. of 1,3-butadiene (measured as gas at S.T.P.) and 162.5 cc. of pentaborane reagent (measured as gas at S.T.P.) were introduced into the reaction vessel and condensed. Then 64.6 cc. of dry hydrogen (measured as gas at S.T.P.) was introduced, and the vessel was allowed to warm up to 0° C. The reaction was allowed to proceed at 0° C. for 5 hours. During this interval, the pressure dropped from 417 mm. of mercury to 289 mm. of mercury. The reaction was proceeding very slowly at the end of the period. To stop the reaction, the contents of the vessel were condensed with liquid nitrogen.

The hydrogen was removed, and its volume was found to be unchanged. The reaction vessel was allowed to warm up by exposure to room temperature, with the result that a portion of the reaction products was vaporized. The vapors were fractionally condensed in a high vacuum line by passage through condensate traps maintained at −80° C. and −196° C., and 8.2 cc. of unreacted 1,3-butadiene and 103.5 cc. of unreacted pentaborane-11 were obtained. The reaction product of pentaborane-11 and butadiene was a water-white liquid remaining in the reaction vessel.

*Example II*

A reaction vessel having a volume of 189 cc. was cooled with liquid nitrogen and 40.3 cc. of vacuum-purified 1,3-cyclopentadiene (measured as gas at S.T.P.) were introduced into the vessel and condensed. Thereafter, 158 cc. of pentaborane reagent (measured as gas at S.T.P.) were also introduced into the vessel and condensed, followed by the addition of 45.0 cc. of hydrogen (measured as gas at S.T.P.). The mixture was allowed to warm up to 0° C. A vigorous action occurred almost immediately, and apparently the reaction mixture boiled. The reaction vessel was maintained at 0° C. for a reaction period of 1.5 hours. The pressure in the vessel was 237 mm. of mercury at the start of the reaction and 232 mm. of mercury at the finish, and appeared to reach a constant value within the first five minutes of reaction. The reaction was stopped by condensing the contents of the vessel with liquid nitrogen.

Hydrogen was removed from the vessel, and was found to have a volume of 47.5 cc. Upon exposure to room temperature, the reaction product was partially vaporized and the vapors were fractionated in a condensate trap maintained at −80° C. The material passing through the trap had a volume of 4.7 cc., and was mainly diborane and small amounts of other boron hydrides accompanied by an unidentified organic material. The condensate in the trap was essentially a mixture of pentaboranes. No 1,3-cyclopentadiene or dimer thereof was recovered.

The reaction product of the pentaborane-11 and 1,3-cyclopentadiene remained in the reaction bulb, and was found to be a water-white, nonvolatile liquid, which did not freeze at −80° C.

*Example III*

A reaction vessel having a volume of 72.8 cc. was charged with 18.6 cc. of pentaborane reagent, 6.3 cc. of 1,3-cyclopentadiene and 53.1 cc. of hydrogen (all three measured as gas at S.T.P.) while maintained at −196° C. The vessel contents were allowed to warm to a temperature of 0° C., and a reaction was carried out for 20 minutes at this temperature. During this time the pressure rose slightly, from 452 mm. of mercury to 458 mm. of mercury. The reaction was stopped by condensing the products.

Hydrogen was removed and was found to have a volume of 53.0 cc. measured at S.T.P. Then the vessel was allowed to warm up by exposure to room temperature, and a portion of the contents was vaporized. The vapors were separated by fractional condensation in a high vacuum line having in series a pair of condensate traps maintained at −80° C. and −196° C., respectively. These vapors consisted mainly of pentaborane-11 and small amounts of other boron hydrides. The total volume of boron hydrides, reported as the equivalent volume of pentaborane-11, was 12.8 cc. This indicates that 5.8 cc. of $B_5H_{11}$ were reacted.

The adduct of $B_5H_{11}$ and 1,3-cyclopentadiene remained in the reaction vessel. This adduct was nonvolatile, water-white, and liquid at both 0° C. and −80° C. The apparent combining ratio of $B_5H_{11}$ and cyclopentadiene was 1:1.

*Example IV*

Into a reaction vessel having a volume of approximately 60 cc. were condensed 23.0 cc. of pentaborane reagent and 5.8 cc. of 1,3-cyclopentadiene (both measured as gas at S.T.P.). No hydrogen was added. The reaction was substantially complete in half an hour. The mixture was allowed to react for an hour and a half. There was recovered pentaborane-11 (19.6 cc.) and substantially no other volatile product. Liquid reaction product of 1,3-cyclopentadiene and pentaborane-11 remained in the distillation vessel.

It is claimed:

1. The method which comprises reacting pentaborane-11 and at least one conjugated diene hydrocarbon containing from 4 to 6 carbon atoms at a temperature within the range from about −40° C. to about 25° C., and wherein the molar ratio of pentaborane-11 to diene hydrocarbon introduced into the reaction system is within the range from 1 to 6:1, to produce a liquid addition product of the pentaborane-11 and the diene hydrocarbon.

2. The method of claim 1 wherein said diene hydrocarbon is 1,3-butadiene.

3. The method of claim 1 wherein said diene hydrocarbon is 1,3-cyclopentadiene.

References Cited in the file of this patent

Hurd: J. Amer. Chem. Soc. 70, pp. 2053–55.